United States Patent
Rudy et al.

(10) Patent No.: US 6,426,379 B1
(45) Date of Patent: Jul. 30, 2002

(54) SILICONE BASED DEFOAMER

(75) Inventors: Rosanna P. Rudy, East Hanover; Andrew A. Romano, Sparta, both of NJ (US)

(73) Assignee: Ashland Inc., Covington, KY (US)

( * ) Notice: Subject to any disclaimer, the term of this patent is extended or adjusted under 35 U.S.C. 154(b) by 99 days.

(21) Appl. No.: 09/599,134

(22) Filed: Jun. 22, 2000

(51) Int. Cl.⁷ .......................... B01D 19/04; C08L 83/12
(52) U.S. Cl. ................... 524/265; 524/261; 516/118; 516/124
(58) Field of Search ............... 516/118, 124; 524/265, 261

(56) References Cited

U.S. PATENT DOCUMENTS

| | | | |
|---|---|---|---|
| 3,562,786 A | | 2/1971 | Bailey et al. ................ 516/18 |
| 4,028,218 A | * | 6/1977 | Fink et al. ................... 516/124 |
| 4,274,977 A | * | 6/1981 | Koerner et al. .............. 516/124 |
| 4,728,680 A | * | 3/1988 | Hahn, Jr. .................... 523/310 |
| 4,824,590 A | * | 4/1989 | Roselle ....................... 510/221 |
| 4,959,272 A | * | 9/1990 | Long ........................... 428/537.7 |
| 5,360,571 A | | 11/1994 | Kilgour et al. ............... 516/55 |
| 5,510,409 A | * | 4/1996 | Romano ...................... 524/265 |
| 5,534,609 A | | 7/1996 | Lewis et al. ................. 528/15 |
| 5,558,806 A | | 9/1996 | Policello et al. ............ 516/204 |
| 5,605,949 A | * | 2/1997 | Anchor et al. .............. 524/261 |
| 5,846,454 A | | 12/1998 | Koczo et al. ................ 516/11 |
| 5,877,268 A | | 3/1999 | Jorgenson et al. .......... 528/15 |
| 6,001,887 A | * | 12/1999 | Keup et al. .................. 516/118 |
| 2002/0026882 A1 | * | 3/2002 | Patel .......................... 524/386 |

OTHER PUBLICATIONS

McCutcheon's vol. i: Emulsifiers & Detergents 1993 North American Edition (McCutcheon Division, MC Publishing Co., Glenrock, NJ, USA) p. 197, Jan. 1994.*

Hawley's Condensed Chemical Dictionary, Eleventh Edition, edited by Sax & Lewis, Sr. (Van Nostrand Reinhold Company, NY, NY, copyright 1987) pp. 1118 & 1279, Oct. 1989.*

* cited by examiner

*Primary Examiner*—Daniel S. Metzmaier
(74) *Attorney, Agent, or Firm*—David L. Hedden

(57) ABSTRACT

This invention relates to a defoamer composition comprising (a) hydrophobic silica; (b) a linear polysiloxane having end-blocked polyoxypropylene groups; (c) a polysiloxane having a pendant polyoxypropylene group; (d) a nonionic surfactant; and preferably (e) an inert diluent. The defoamer compositions are used in paints and coatings.

7 Claims, No Drawings

SILICONE BASED DEFOAMER

FIELD OF THE INVENTION

This invention relates to a defoamer composition comprising (a) hydrophobic silica; (b) a linear polysiloxane having end-blocked polyoxypropylene groups; (c) a polysiloxane having a pendant polyoxypropylene group; (d) a nonionic surfactant; and preferably (e) an inert diluent. The defoamer compositions are used in paints and coatings.

BACKGROUND OF THE INVENTION

A defoamer is often an essential component to a paint or coating. Without a defoamer, bubbles will form in the paint or coating. When the paint or coating is applied to the substrate, the bubbles will dry on the substrate. These dried bubbles are not aesthetically pleasing. Furthermore, a substrate with dried bubbles is not effectively covered and protected from the environment.

Polysiloxanes are often used in defoamer compositions. When used in such compositions, the polysiloxane is usually added to the "grind" component that diminishes defoamer "persistency". Polysiloxane defoamers must be used judiciously in coatings to minimize "fish eye" formation that result from high surface tension differences between the product and substrate. Despite their outstanding foam destroying properties, polysiloxane at levels of 500 ppm can cause severe film defects, since even slight incompatibility between the surface and the coating can result in gloss reduction.

Linear polysiloxane having repeating internal siloxane moieties and an end blocked polypropylene oxide moiety are known. U.S. Pat. No. 3,562,786, which are hereby incorporated by reference, discloses defoaming compositions containing a polysiloxane having a pendant polyoxyalkylene group and an organic surfactant. The polyoxyalkylene group of the polysiloxane contains both polyoxyethylene and polyoxypropylene moieties. Polysiloxanes containing pendant polyoxypropylene moieties bonded to a dimethylsiloxane moiety are also known. See U.S. Pat. Nos. 5,558,806 and 5,534,609.

SUMMARY OF THE INVENTION

This invention relates to a defoamer composition comprising:

(a) hydrophobic silica;
(b) a linear polysiloxane having end-blocked polyoxypropylene groups;
(c) a polysiloxane having a pendant polyoxypropylene group; and
(d) a nonionic surfactant.

The defoamer preferably also contains a diluent.

The defoamer compositions are used in paints and coatings. The pendant group of component (c) is a polyoxypropylene group, and does not contain a polyoxyethylene group. An advantage of the defoamer is that it can be added to the paint formulation after it is formulated and will not degrade even after an extended shelf life. It is particularly compatible and widely effective in high gloss systems that are difficult to defoam. The defoamer compositions can be stored at temperatures of 0° C. to 40° C. for several months (typically up to six or even twelve months), without a phase separation, before using them.

ENABLING DISCLOSURE AND BEST MODE

Component (a) is hydrophobic silica. The hydrophobic silica preferably has a surface energy of from about 10 to about 40 dynes/cm$^2$, preferably from about 20 to about 30 dynes/cm$^2$. Preferably, the hydrophobic material is precipitated hydrophobic silica or a hydrophobic wax having an average particle size of from 5 to 75 microns, preferably 10 to 15 microns. Precipitated hydrophobic silica is made by treating hydrophilic silica with silicone according to well-known methods. Such precipitated hydrophobic silica can be purchased from Degussa, Georgia Kaolin, and J. M. Huber.

Component (b) is a linear polysiloxane having end-blocked polyoxypropylene groups, preferably having the following structural formula:

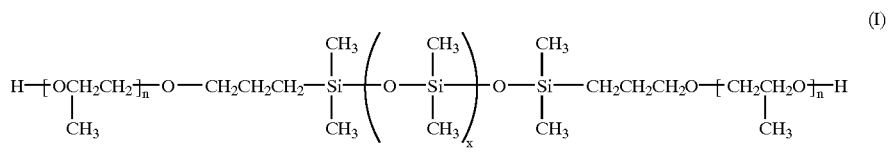

(I)

where x is from about 12 to about 25 and n, which may be the same or different for each polyoxypropylene group, is from about 8 to 15, preferably about 12.

Component (c) is a polysiloxane containing pendant polyoxypropylene groups, preferably having the following structural formula:

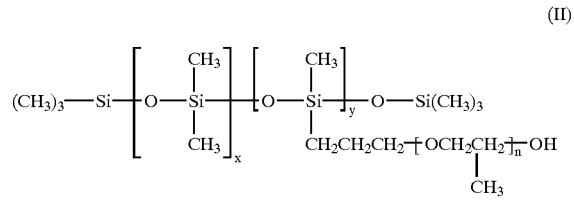

(II)

where x is from about 50 to about 80, y is from about 7 to about 9, and n is from about 8 to 15, most preferably where x=about 65, y=about 8, and n=about 12. The weight ratio of (I) to (II) is typically from 30:100 to 70:100, preferably from 50:100.

Component (d) is a nonionic surfactant having an average molecular weight of from about 300 to about 5,000, preferably from about 900 to about 1100, and a weight ratio of hydrophobic segment to hydrophilic segment of about 5 to about 2 preferably from about 3 to about 2. Preferably, polyethylene glycol monooleate is used as the nonionic surfactant.

The defoamer composition preferably contains a diluent. A wide variety of diluents can be used, e.g. water immiscible fluids such as liquid hydrocarbons having a pour point in the range of about −40° C. to −10° C. Preferably used, as the diluent, is polypropylene glycol having an average molecular weight of preferably from about 1500 to about 2500.

The amounts of the components used to make the defoamer are as follows, where the weight percents are based upon the total weight of defoamer:

(a) from 40 to 75 weight percent of diluent, preferably 45 to 70, weight percent;
(b) from 1 to 10 weight percent of hydrophobic silica, preferably 5 to 10;
(c) from 5 to 25 weight percent of a linear polysiloxane, preferably 5 to 15 weight percent;
(d) from 5 to 30 weight percent of a polysiloxane having pendant polyoxypropylene group, preferably 10 to 25 weight percent; and
(e) from 3 to 15 weight percent of a nonionic surfactant, preferably 5 to 12, most preferably from 6 to 10 weight percent.

Optional components of the defoamer include sorbitan tristearate, waxes, other surfactants, fatty acid esters, and end capped propylene oxide and/or butylene oxide polymers.

The defoamers can be stored at temperatures of 0° C. to 40° C. for several months (typically up to six or even twelve months) before using them without a phase separation. They are typically mixed in paints or coatings, preferably latex emulsions, in amounts of 0.01 to 2.0 part by weight based upon the weight of the latex emulsion, preferably from 0.2 to 0.8 part by weight.

Such formulated paints and coatings may include one or more of the following components in a addition to a defoamer: (1) 5.0 to 75.0 parts by weight of a latex emulsion (2) 20.0 to 60.0 parts by weight of water; (3) 1.0 to 40 parts by weight of a pigment; (4) 1.0 to 10.0 parts by weight of a polymeric binder; (5) 1.0 to 10 parts by weight of a coalescing aid; (6) 1.0 to 10.0 parts by weight of a thickener; (7) 0.1 to 2.0 parts by weight of a dispersant; (8) 0.01 to 1.0 part by weight of a biocide; (9) 1.0 to 25.0 parts by weight of a pigment; (10) 5.0 to 40.0 parts by weight of an extender pigment; (11) 1.0 to 5.0 parts by weight of a rheology modifier; (12) 1.0 to 5.0 parts by weight of a glycol, e.g. propylene glycol; (13) 0.1 to 2.0 parts by weight of a surfactant; and/or (13) 0.01 to 2.0 parts by weight of a base, e.g. ammonium hydroxide.

EXAMPLES 1–3

A defoamer composition was prepared by mixing the components set forth in Table I in the sequence as set forth in Table I:

TABLE I

COMPOSITION OF DEFOAMER

| COMPONENT | AMOUNT (pbw) |
|---|---|
| Polypropylene glycol (MW 2000) | 48.6% |
| Hydrophobic silica | 5.4% |
| Linear Polysiloxane where x = 15 | 11.9% |
| Pendant Polysiloxane where x = 65 and y = 8 | 24.1% |
| Polyethylene glycol monooleate | 10% |

In order to test the effectiveness of the defoamer compositions, 0.2 part of the defoamer was added to a paint formulation that did not contain a defoamer (Control), and was tested for foaming. The paint formulation is described in Table II. The formulation is mixed for 5 minutes in order to generate foam. At the end of the 5 minutes, the density of 100 cc of the paint was determined. The density is the weight of the paint divided by the volume. A lower density for an equal volume of liquid indicates that the liquid contains more entrapped air, which is a reflection of increased foaming.

The "bubble break" time of the paint is also measured. The bubble break time is the time it takes for a bubble to break after paint application by roller. After a bubble appears, the amount of time for it to break is measured. If the time is less, this indicates that the defoamer works more effectively.

Drawdowns of the paint were also taken to measure gloss and other surface characteristics.

The results of the tests for the Control (without a defoamer) and the paint formulations are shown in the Tables that follow. The test methods are described as follows:

Shake Density

In order to determined the shake density of the paint, a sample of the paint was placed into a container and weighed. The samples were then shaken for about 5 minutes in a Red Devil Shaker. Then 100 ml of the shaken sample was poured into a tared graduated cylinder and the weight was measured. The density was then calculated.

Bubble Break

Bubble break was measured by rolling a coating formulation containing the defoamer onto Sherwin Williams type paper using a 3" roller having a ⅜" nap. After uniformly rolling the coating onto the paper, the time for all the formed bubbles to break was measured, up to 5 minutes. The dry and wet film appearances were also noted.

Drawdown

Films for drawdowns were prepared by pulling the coating with a 3 millimeter Bird blade on a Form 1B Penoopac Leneta chart and then observing film defects.

Gloss

Gloss was measured on film drawdown after drying for minimum of 16 hours at 20° and 60° angles using BYK-Gardner Mciro-TRI-Glossmeter. Higher readings mean higher gloss.

TABLE II

VINYL ACRYLIC GLOSS FORMULATION

| Component | Amount |
|---|---|
| Water | 15.0 |
| Propylene Glycol | 60.5 |
| TAMOL ® 731 | 11.5 |
| Preservative | 1.0 |
| TRITON ® N-57 | 1.0 |
| AMP-95 | 2.0 |
| ATTAGEL ® 50 | 5.0 |
| ZOPAQUE ® RCL-9 | 255.0 |
| Water | 25.0 |
| Latex 367 | 467.0 |
| TEXANOL ® | 20.0 |
| TRITON ® GR-7M | 1.0 |
| Water | 133.6 |
| Propylene Glycol | 34.5 |
| ACRYSOL ® SCT-275 | 30.4 |
| Ammonium hydroxide, 28% | 3.0 |

TAMOL® 731 is a salt of a polymeric carboxylic acid dispersant (available from Rohm & Haas Co., Philadelphia, Pa.). TRITON® N-57 is a nonionic emulsifier nonylphenoxy polyethoxy ethanol (available from Union Carbide Chem. & Plastics Company). AMP-95 is 2-amino-2-methyl-1-propanol. ATTAGEL® 50 is attapulgite clay powder (available from Engelhard Minerals and Chemicals Corporation). ZOPAQUE® RCL-9 is titanium dioxide (available from SCM Corporation). TEXANOL® is 2,2,4-trimethylpentanediol 1,3-monoisobutyrate (available from Eastman Chemicals). TRITON® GR-7M is dioctyl sodium sulfosuccinate (available from Union Carbide Chem. & Plastic Company). ACRYLSOL® SCT-275 is a thickner (available from Rohm & Haas Co., Phiadelphia, Pa.).

TABLE III

TEST RESULTS OF DEFOAMER PERFORMANCE IN A HIGH GLOSS ACRYLIC PAINT

| Product | Dose | Bubble Break[1] | Drawdown | Gloss (20°/60°) |
|---|---|---|---|---|
| Control[2] | 0 | >300 | good | 45/80 |
| Example 1 | 0.2 | 0 | good | 44/83 |
| Comp A[3] | 0.2 | 35 | fish eyes | 33/72 |
| Comp B[4] | 0.2 | >300 | good | 27/71 |
| Comp C | 0.2 | >300 | good | 25/70 |

The data in Table III indicate that the defoamer of Example 1 provided the best overall characteristics with respect to all of the properties measured.

In addition to the properties set forth in Table III, the defoamer must be compatible and remain compatible with the other components of the paint or coating. The persistency of the coating is a measurement of how compatible the defoamer is in the paint over time. The results are summarized in Table IV.

TABLE IV

PERSISTENCY OF DEFOAMER IN HIGH GLOSS ACRYLIC PAINT

| Product | Dose | Initial | After two weeks 120° F. |
|---|---|---|---|
| Comp D | 0.4 | no foam | much foam |
| Example 1 | 0.4 | no foam | a few bubbles |

[1]In seconds.
[2]Did not contain a defoamer.
[3]Composition A is a defoamer, which is a blend of silica derivatives consisting of cSt silicone fluid and an alkyl-pendant copolymer.
[4]Compositions B, C, and D are competitive defoamers containing a polysiloxane and a solid hydrophobic material. The specific formulae and structures are not known.

We claim:

1. A defoamer composition comprising:
   (a) hydrophobic silica;
   (b) a linear polysiloxane having end-blocked polyoxypropylene groups having the following structural formula:

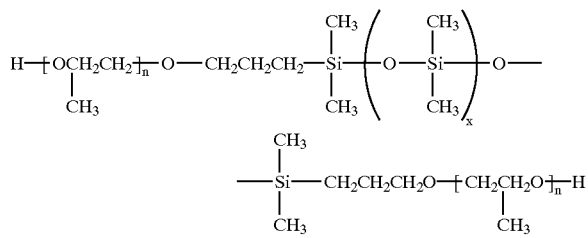

where x is from about 12 to about 25 and n, which may be the same or different for each polyoxypropylene group, is from about 8 to 15;
   (c) a polysiloxane having a pendant polyoxypropylene groups having the following structural formula:

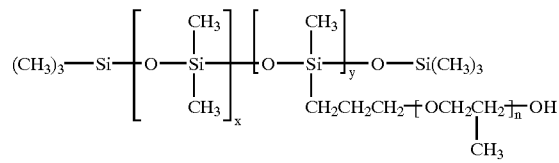

where x is from about 50 to abut 80, y is from about 7 to about 9, and n is from about 8 to 15; and
   (d) a nonionic surfactant.

2. The defoamer composition of claim 1, wherein the weight ratio of (b) to (c) is from 30:100 to 70:100.

3. The defoamer composition of claim 2 wherein in component (b), n is about 12; and in component (c), x=about 65, y=about 8, and n about 12, and the weight ratio of (b) to (c) is from about 50:100.

4. The defoamer composition of claim 3 which also contains a diluent.

5. The defoamer composition of claim 4, wherein the diluent is polypropylene glycol.

6. The defoamer composition of claim 5 wherein the amounts of the components are:
   (a) from 45 to 70 weight percent of a diluent where the diluent is polypropylene glycol having an average molecular weight of about 1500 to about 2500;
   (b) from 5 to 10 weight percent of hydrophobic silica;
   (c) from 5 to 15 weight percent of said linear polysiloxane having end-blocked polyoxypropylene groups;
   (d) from 10 to 25 weight percent of a polysiloxane having pendant polyoxypropylene group; and
   (e) from 6 to 10 weight percent of a nonionic surfactant having an average molecular weight of about 900 to about 1000, where said weight percents are based upon the total weight of defoamer.

7. In a formulation paint or coating comprising water, a latex emulsion, a polymeric binder, and a pigment, wherein the improvement comprises incorporating an effective defoaming amount of the defoamer of claim 1, 2, 3, 4, 5, or 6 into said paint or coating.

* * * * *